United States Patent [19]

Stephen et al.

[11] Patent Number: 4,598,113

[45] Date of Patent: Jul. 1, 1986

[54] HINDERED HYDROXYPHENYLALKANOATES OF ETHOXYLATED BISPHENOL A AND STABILIZED COMPOSITIONS

[75] Inventors: John F. Stephen, West Chester, Pa.; Jerry H. Smith; Makram H. Meshreki, both of Wilmington, Del.

[73] Assignee: ICI Americas Inc., Wilmington, Del.

[21] Appl. No.: 765,641

[22] Filed: Aug. 15, 1985

[51] Int. Cl.[4] ............... C07C 69/76; C07C 69/78; C08K 5/13
[52] U.S. Cl. .................... 524/291; 560/61; 524/120; 524/151
[58] Field of Search ............ 524/291, 120, 151; 560/61

[56] References Cited

U.S. PATENT DOCUMENTS

| | | | |
|---|---|---|---|
| 3,577,384 | 5/1971 | Mauz et al. | 524/291 |
| 3,657,321 | 4/1972 | Steinberg et al. | 524/291 |
| 3,917,672 | 11/1975 | Schmidt | 524/291 |
| 4,001,299 | 1/1977 | Dexter et al. | 524/291 |

*Primary Examiner*—Veronica P. Hoke
*Attorney, Agent, or Firm*—Richard A. Rowe

[57] ABSTRACT

Novel hydroxyalkylarylalkanoates of ethoxylated bisphenol A are provided which are useful as stabilizers of resins made from at least one ethylenically unsaturated monomer. A process for manufacture of these stabilizers is also provided.

7 Claims, No Drawings

HINDERED HYDROXYPHENYLALKANOATES OF ETHOXYLATED BISPHENOL A AND STABILIZED COMPOSITIONS

The present invention relates to novel hydroxyphenylalkanoates of ethoxylated bisphenol A, to stabilized polymer resins containing these materials, and to methods for their preparation. It also relates to resins containing the novel stabilizers with costabilizers including thio-synergists and phosphites.

The hindered hydroxyphenylalkanoates of the invention have the following general formula:

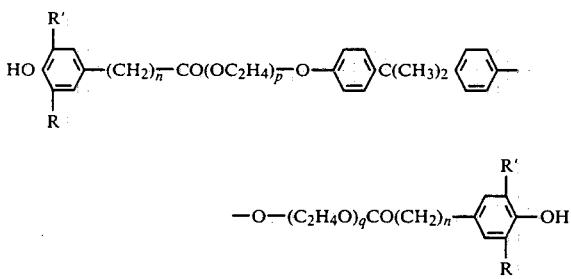

wherein:

R and R' are independently hydrogen or alkyl groups of from 1 to 4 carbon atoms, p and q are 1 or 2, p+q has a value of 2 to 3, and n has a value of 1 to 6.

Preferably, R and R' are tert-butyl or when R is tertbutyl, R' is methyl, n has a value of 1 or 2, and p and q have a value of 1.

U.S. Pat. No. 3,577,384 discloses a stabilizer containing an ethoxylated bisphenol A esterified with a bis(partially hindered hydroxyphenyl)butanoic acid.

In U.S. Pat. No. 3,657,321 is disclosed a stabilizer containing a hindered hydroxyphenyl propionate derivative of unsubstituted bisphenol A.

U.S. Pat. No. 3,944,594 discloses a stabilizer containing a polyalkylene glycol esterified with a hindered hydroxyphenyl propionic acid.

The compounds of the instant invention are unexpectedly superior to those of the prior art.

The compounds of the present invention can be prepared from lower alkyl esters of a hindered hydroxyphenylalkanoic acid and the appropriate bisphenol A ethoxylate by transesterification in the presence of a suitable catalyst. Lower alkyl esters of hindered hydroxyphenylalkanoic acids are prepared according to the methods of U.S. Pat. No. 3,330,859 and U.S. Pat. No. 3,364,250. The desired bisphenol A ethoxylates can be prepared by reaction of bisphenol A with ethylene oxide. It is also known that bisphenol A bisethoxylate can be prepared by reaction of bisphenol A with ethylene carbonate in the presence of a catalyst as disclosed in U.S. Pat. No. 4,310,706, U.S. Pat. No. 4,310,707, and U.S. Pat. No. 4,310,708.

This invention also relates to a process for preparing the compounds described herein. Although the compounds of this invention can be prepared by the usual methods as discribed above, it has been found that an improved overall yield can be obtained if ethoxylation of bisphenol A and transesterification of the resolution crude product are carried out in a sequential, one-pot process in the presence of a suitable catalyst such as lithium amide.

The compounds of this invention are stabilizers of organic material normally subject to thermal and oxidative deterioration. Materials which are thus stabilized include synthetic organic polymeric substances such as vinyl resins formed from the polymerization of ethylenically unsaturated monomers such as vinyl halides or from the copolymerization of vinyl halides with unsaturated polymerizable compounds, e.g, vinylesters, α,β-unsaturated ketones, α,β-unsaturated aldehydes, and unsaturated hydrocarbons such as butadienes and styrene; poly-α-olefins such as polyethylene, polypropylene, polybutylene, and the like, including copolymers of poly-α-olefins; polyurethanes and polyamides such as polyhexamethylene adipamide and polycaprolactam; polyesters such as polyethylene terephthalates; polycarbonates; polyacetals, polystyrene; polyethyleneoxide; polyisoprene; polybutadiene and copolymers such as those of high impact polystyrene containing copolymers of butadiene and styrene and those formed by the copolymerization of acrylonitrile, butadiene and/or styrene.

In general, one or more of the stabilizers of the present invention are employed in amounts about 0.005 to about 5% by weight of the composition to be stabilized. A particularly advantageous range of the present stabilizers is from about 0.05% to about 2%. The preferred range is particularly effective in polyolefins such as polypropylene.

These compounds may be incorporated in the polymer substance during the usual processing operations, for example, by milling, or extrusion. The stabilized polymer can be fabricated into films, fibers filaments, hollow-spheres and the like. The heat stabilizing properties of these compounds advantageously stabilize the polymer against degradation during such processing at the high temperatures generally encountered.

The stabilizers employed in this invention can also be used in combination with other stabilizers or additives. Especially useful costabilizers are dilauryl-β-thiodipropionate and distearyl-β-thiodipropionate.

The stabilizers described in this invention can be used in combination with di- and tri-alkyl and alkylphenyl phosphites such as tris-nonylphenyl phosphite, tris di-tert-butylphenyl phosphite, bis(2,4-di-t-butylphenyl)-pentaerythritol diphosphite, tetra(di-tert-butylphenyl diphenyl-4,4'-ene-diphosphonite, and distearyl pentaerythritol diphosphite.

Other antioxidants, antiozonants, thermal stabilizers, ultraviolet light absorbers, coloring materials, dyes, pigments, metal chelating agents, etc., may also be used in the compositions in combination with the stabilizers of the invention.

The following examples serve to illustrate but not limit the invention. All expressed proportions are by weight unless otherwise specified.

EXAMPLE 1

2,2-Bis[4-(2-(3,5-di-tert-butyl-4-hydroxyhydrocinnamoyloxy))ethoxyphenyl]propane Methyl 3,5-di-tert-butyl-4-hydroxyhydrocinnamate (6.42 g) was added to a flask equipped with a reflux condenser heated to 65° C. with hot water. The material was heated to 140° C. under N$_2$ with magnetic stirring. Sodium methoxide (0.054 g) was added and a vacuum (10 mm) was applied. After 15 min., the vacuum was broken with N₂ and 2,2-bis[4-(2-hydroxy)ethoxyphenyl]propane (3.16 g) was added. Vacuum was reapplied and temperature was slowly increaded to 160° C. After 4 hrs., the reaction was quenched with acetic acid and crystallized from isopropanol to give 7.5 g (89%) of the desired product, mp 104°–106° C.

Calculated for $C_{53}H_{72}O_8$: C, 76.07; H, 8.61. Found: C, 75.94; H, 8.66.

EXAMPLE 2

In a manner similar to Example 1, methyl 3,5-di-tert-butyl-4-hydroxyhydrocinnamate was reacted with a derivatized bisphenol A compound containing an average of 2.2 hydroxyethyl groups per bisphenol A.

The product was crystallized from methanol to give a solid whose composition was mainly bis-esterified bis-hydroxyethyl bisphenol A (Example 1) containing some bis-esterified trishydroxyethyl bisphenol A.

EXAMPLE 3

In a manner similar to Example 1, methyl 3-methyl-5-tert-butyl-4-hydroxyhydrocinnamate can be substituted for methyl 3,5-di-tert-butyl-4-hydroxyhydrocinnamate to give 2,2-bis[4-(2-(3-methyl-5-tert-butyl-4-hydroxyhydrocinnamoyloxy))ethoxyphenyl]propane.

EXAMPLE 4

The compound of Example 1 was made by the following alternate procedure. 2,6-Di-tert-butyl phenol (68.0 g) was added to a flask equipped with a nitrogen inlet, thermometer, addition funnel, and reflux condenser. The flask was heated to 110° C. with magnetic stirring and NaOCH₃ (0.71 g) was added under nitrogen. Methyl acrylate (34.4 g) was added dropwise over a period of 2 hrs. Reaction was continued for 3 hrs. at which time, the reaction flask was refitted with a reflux condenser heated with hot water (65° C.). Bis-hydroxyethyl bisphenol A (45.5 g) was added to the reaction flask and a vacuum was applied and slowly adjusted to 20 mm. The reaction temperature was slowly increased to 170° C. Volatiles were collected in a trap cooled in dry ice. After 3 hrs., the reaction mixture was quenched with acetic acid and poured into methanol. The desired product was obtained by crystallization from the methanol after cooling.

EXAMPLE 5

A preferred process for preparation of the compound of Example 1 is described in the following procedure. Bisphenol A (34.2 g) and ethylene carbonate (27.7 g) were added to a flask equipped with a nitrogen inlet and a reflux condenser. The material was heated to 180° C. with magnetic stirring under a slow stream of nitrogen. Lithium amide (0.138 g) was added and the reaction mixture was heated at 180° C. for 1.5 hr. The reflux condenser was switched to hot water (65° C.) and methyl 3,5-di-tert-butyl-4-hydroxyhydrocinnamate (91.5 g) was added. A vacuum was slowly applied to 20 mm and volatiles were collected in a dry-ice trap. The reaction mixture was held at 180° C./20 mm for 0.5 hr. The temperature was then raised to 210° C. and held there for 5 hr. The reaction was quenched with acetic acid (or propionic acid) and recrystallized from methanol to give 112.3 g (89% overall yield) of the desired product.

EXAMPLE 6

This example shows the usefulness of the invention for stabilization of polypropylene. The stabilizers were incorporated into Profax 6301 TM polypropylene resin by solvent blending (methylene chloride) followed by extrusion at 200° C. Twenty-five mil plaques were prepared by compression molding at 6,000 psi and 188° C. Samples were tested in a forced draft oven at 150° C. Failure was determined when the first signs of decomposition were observed. Tests were run in quadruplicate and an average value was determined. Results are shown in Table I.

TABLE I

| Stabilizer | Concentration (%) | Hours to Failure |
|---|---|---|
| none | — | 24 |
| Example 1 | 0.10 | 624 |
| Example 2 | 0.10 | 576 |
| Example 1/DSTDP | 0.10/0.25 | 2106 |
| Example 2/DSTDP | 0.10/0.25 | 1656 |

EXAMPLE 7

This example shows the usefulness of the invention for stabilization of high impact polystyrene. The stabilizers were incorporated into high impact polystyrene by milling at 188° C. Twenty mil plaques were prepared by compression molding at 6,000 psi and 188° C. Samples were tested in a forced draft oven at 90° C. Failure was determined when cracking was observed after flexing the plaque over a one-inch mandrel. Tests were run in quadruplicate and an average value was determined. Results are shown in Table II.

TABLE II

| Stabilizer | Concentration (%) | Hours to Failure |
|---|---|---|
| none | — | 48 |
| Example 1 | 0.10 | 192 |
| Example 2 | 0.10 | 228 |

EXAMPLE 8

This example shows the usefulness of the invention for stabilization of high density polyethylene. The stabilizers were incorporated into high density polyethylene (Allied Chemical EA 55-003) by solvent blending (methylene chloride) followed by extrusion at 230° C. Samples were tested in a forced draft oven at 120° C. Failure was determined when cracking was observed after flexing. Tests were run in quadruplicate and an average value was determined. Results are shown in Table III.

TABLE III

| Stabilizer | Concentration (%) | Hours to Failure |
|---|---|---|
| none | — | 48 |
| Example 1 | 0.05 | 3834 |
| Example 1/Weston 618 | 0.025/0.05 | 3294 |

What is claimed is:
1. A hindered hydroxyphenylalkanoate of ethoxylated bisphenol A having the formula:

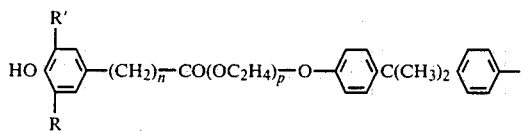

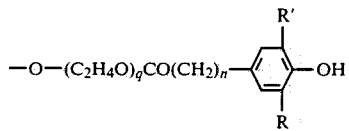

wherein:

R and R' are independently hydrogen or alkyl groups of from 1 to 4 atoms, p and q are 1 or 2, p+q has a value of 2 to 3, and n has a value of 1 to 6.

2. A compound of claim 1 where R and R' are both tert-butyl.

3. A compound according to claim 2 where p and q are both equal to 1.

4. A compound of claim 2 where p+q=2.2.

5. A composition comprising a polymerized ethylenically unsaturated monomer and 0.005–5% by weight of a compound of claim 1.

6. A composition of claim 5 comprising a resin selected from the group consisting of polyethylene, polypropylene, and polystyrene.

7. A composition of claim 6 further comprising a co-stabilizer compound selected from the group consisting of dilauryl-$\beta$-thiodipropionate, distearyl-$\beta$-thiodipropionate, distearyl pentaerythritol diphosphite, pentaerythritol tetrakis(3-(dodecylthio)propionate), tris(2,4-di-tert-butylphenyl)phosphite, bis(2,4-di-tert-butylphenyl)pentaerythritol diphosphite, and tetrakis(2,4-di-tert-butylphenyl)-4,4'-bisphenylene diphosphonite.

* * * * *